Aug. 7, 1951     A. D. ROSE ET AL     2,563,749
INSTRUMENT WITH HANGER
Filed Jan. 24, 1949
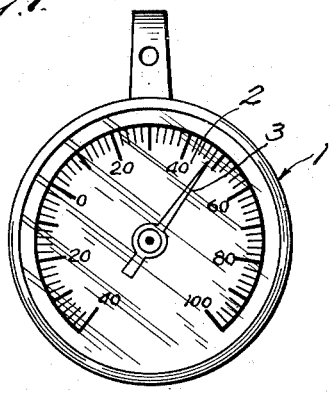
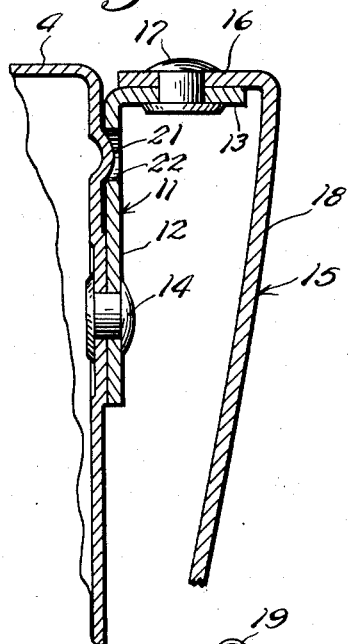
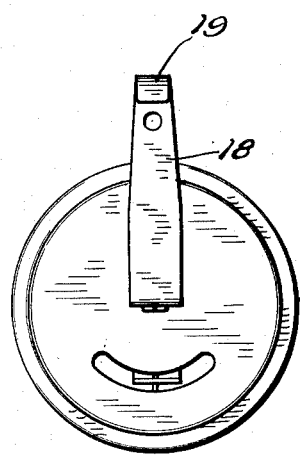
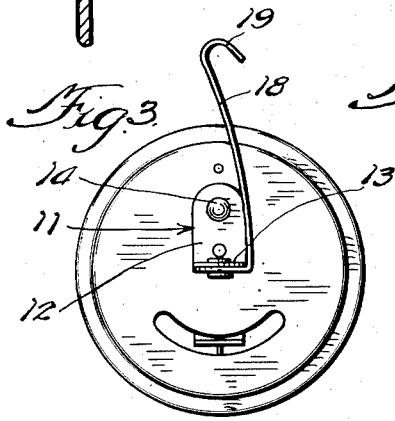
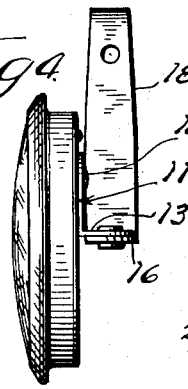
INVENTORS.
Alexander D. Rose
& Bernhard Willach
By Thiess, Olson & Mecklenburger
Attys.

Patented Aug. 7, 1951

2,563,749

UNITED STATES PATENT OFFICE 2,563,749

INSTRUMENT WITH HANGER

Alexander D. Rose, Park Ridge, and Bernhard Willach, Chicago, Ill., assignors to Jas. P. Marsh Corporation, Skokie, Ill., a corporation of Illinois Application January 24, 1949, Serial No. 72,528

5 Claims. (Cl. 24—3)

1

The present invention relates to an instrument and has special reference to a pocket instrument such as a pocket dial thermometer.

More particularly this invention relates to a pocket instrument having a combined pocket clip and hanger. While the present invention relates to various types of instruments, it will be considered in connection with a pocket dial thermometer which, being designed to fit into a pocket, may be round and of a size comparable to a pocket watch.

A thermometer of this type may be widely employed for testing purposes, as in servicing refrigerators, cold boxes, cold rooms, and various types of heating jobs.

In use, the instrument is preferably hung from whatever support is available in such position that it may be easily read, at least as soon as the cover or door of the enclosure to be tested is opened. The available supporting means may vary and be differently arranged in different types of units. The support may consist of a substantially horizontal rod, wire, or other element, and may extend transversely, longitudinally, or diagonally.

The present instrument is provided with a hanger on the back thereof by means of which it may be suspended from any such support or from a nail and still be arranged with the dial positioned to be readily seen by the tester. The hanger is also designed to serve as a clip when the instrument is carried in a pocket, thereby preventing accidental displacement with consequent loss of, or injury to, the instrument.

An object of the present invention is to provide an instrument having a hanger for support thereof.

Another object is to provide an instrument having a hanger which may be readily adjusted with respect to the instrument.

Still another object is to provide an instrument having an adjustable hanger by means of which the instrument may be supported from a longitudinally, transversely, or diagonally extending, substantially horizontal, supporting member and still be arranged to face in the direction desired.

A still further object is to provide an instrument having an adjustable hanger with an opening therein to enable it to be placed on the end of a nail or similar projection.

An additional object is to provide an instrument having a hanger of the above type which also may be arranged to serve as a pocket clip.

Further objects and advantages will be apparent from the following description and claims when considered with the drawings, in which:

Fig. 1 is a front elevational view of an instrument having a combined hanger and pocket clip thereon embodying the present invention;

Fig. 2 is a rear view of the instrument and hanger shown in Fig. 1;

Fig. 3 is a view similar to Fig. 2 with the hanger in changed position;

Fig. 4 is a side elevational view of the instrument shown in Fig. 3;

Fig. 5 is a view similar to Fig. 2 with the hanger arranged to serve as a pocket clip;

Fig. 6 is a top plan view of the instrument and clip shown in Fig. 5; and

Fig. 7 is an enlarged cross-sectional view taken on the line 7—7 of Fig. 5.

Referring more particularly to the drawings, there is shown a dial thermometer 1 of a size to fit into a pocket, having a dial or face 2 and an indicator 3. The dial thermometer is of the usual type with a front glass positioned over the dial. The operating mechanism is positioned in a casing 4, to the back of which the combined hanger and pocket clip is secured.

As shown particularly in Figs. 3, 4, and 7, this comprises a bracket 11 substantially L-shaped in cross section. The upright portion 12 of the bracket serves as a securing member and the foot or transverse portion 13 thereof extends outwardly to form a shelf or mounting portion. The end of the securing portion 12 of the bracket is pivoted to the rear of the instrument casing 4 by suitable means, such as a rivet 14. As the shelf portion 13 of the bracket is spaced from the pivot 14 it will move about the pivot as the bracket 11 is rotated. The pivotal connection between the bracket and the instrument casing is offset a distance from the center of the rear face of the casing. It is preferable to have the rivet 14 hold the bracket 11 fairly tightly against the casing 4, so that the bracket will be frictionally held in any position to which it is turned.

Secured to the shelf portion 13 of the bracket 11 is a hanger and clip member 15, preferably formed of a strip of steel or other suitable resilient material. This hanger member has a flange or transversely projecting portion 16 at one end which is pivotally secured to the shelf portion 13 of bracket 11, with the hanger member extending therefrom in the same general direction as the upright portion 12 of the bracket. A rivet 17, or any other type of pivot member desired may be employed to secure the flange 16 to the shelf portion 13. The axis of pivot 17 is substantially at right angles to the axis of pivot 14. The hanger 15 is provided with an elongated body portion 18.

The angle between the body portion 18 and the flange 16 is preferably less than 90° and is such that the free end of the hanger will slope from adjacent the outer side of the shelf portion 13 gradually toward the casing and may be substantially in contact therewith when in the position shown in Figs. 5 and 7, this being the position of the hanger member when it is arranged to serve as a clip. The free end of the hanger 15 is shaped to form a hook 19 facing outwardly in a direction opposite to that in which the flange 16 extends. An opening 20 is formed in the hanger adjacent the hook to permit it to be inserted over the projecting end of a nail or similar projecting member.

As it is desired to prevent movement of the hanger member 15 when it is positioned to serve as a clip, cooperating latch means are provided, one form of which, illustrated in Fig. 7, may consist of a projection 21 on the rear of the instrument casing 4 for detachably seating in the opening 22 formed in the securing portion 12 of the bracket 11.

When the hanger is to be employed as a clip, it is arranged as shown in Figs. 5 and 7. Thus, when the instrument is placed in a pocket the clip will fit over the outer side of the pocket and clamp the material between it and the rear of the instrument casing in the same manner as an ordinary fountain pen clip. In view of the shaped, free end of the bracket 15, the clip may be readily inserted over or removed from the outer side of a pocket.

When the hanger member 15 is to be used for supporting the instrument, the bracket 11 is rotated about the pivot 14, preferably substantially 180° from its clip position shown in Fig. 5 to normal hanger position illustrated in Figs. 1, 2, 3, and 4. In this latter arrangement, the flat face of the clip may be substantially parallel to the rear of the casing but inclined slightly toward the same, as seen in Figs. 1 and 2, or the hanger portion may be rotated or swivelled in opposite directions about the pivot 17 to a position such as that shown in Figs. 3 and 4. Accordingly, the hooked end 19 of the hanger may be adjusted to hang over a wire or other more or less horizontal support extending longitudinally, transversely, or diagonally of the container or room, the temperature of which is to be taken, and the face of the instrument may still be directed toward the front or open side thereof.

The present invention has been described in connection with a pocket dial thermometer. However, it is to be understood that the hanger and clip may be combined with other types of pocket instruments. By means of the present construction the instrument may be safely maintained in a pocket when not in use, and when employed for ascertaining temperatures may be suspended from any suitable support in such manner as to permit easy reading thereof.

While we have shown a particular embodiment of our invention, it will be understood that we do not wish to be limited thereto since many modifications may be made, and we therefore contemplate, by the appended claims, to cover any such modifications as fall within the true spirit and scope of our invention.

We claim:

1. The combination with a dial pocket instrument having a casing of a hanger comprising a bracket pivotally secured to the back of the instrument casing and having a shelf portion extending rearwardly thereof, and a hanger member swivelled thereon for rotation about an axis substantially normal to said shelf portion, said hanger member having a hooked portion at the outer free end.

2. The combination with a dail pocket instrument having a casing of a hanger comprising a bracket pivotally secured to the rear of the instrument casing, said bracket having a shelf portion extending rearwardly of said casing and spaced from said pivot so as to be movable thereabout, an elongated hanger member having a flange at one end pivotally secured to the shelf portion of said bracket and a hooked portion at the outer end thereof.

3. The combination with a dial pocket instrument having a casing of a hanger comprising a bracket pivotally secured to the rear of the instrument casing, said bracket having a shelf portion extending rearwardly of said casing and spaced from said pivot so as to be movable thereabout, an elongated hanger member having a substantially transverse flange at one end pivotally secured to the shelf portion, said hanger sloping from the outer side of said shelf portion inwardly to substantially the rear plane of said instrument casing at the outer free end of said hanger.

4. The combination with a dial pocket instrument having a casing of a hanger comprising a bracket pivotally secured to the rear of the instrument casing, said bracket having a shelf portion extending rearwardly of said casing and spaced from said pivot so as to be movable thereabout, an elongated hanger member of resilient material having a substantially transverse flange at one end pivotally secured to the shelf portion, said hanger sloping from the outer side of said shelf portion inwardly to substantially the rear plane of said instrument casing at the outer free end of said hanger.

5. The combination with a dial pocket instrument having a casing of a hanger comprising a bracket pivotally secured to the rear of the instrument casing, said bracket having a shelf portion extending rearwardly of said casing and spaced from said pivot so as to be movable thereabout, an elongated hanger member of resilient material having a substantially transverse flange at one end pivotally secured to the shelf portion, said hanger sloping from the outer side of said shelf portion inwardly to substantially the rear plane of said instrument casing at the outer free end of said hanger, and cooperating latching means on the rear of said casing and said bracket for detachably fixing said bracket with the shelf portion thereof positioned radially outwardly of said instrument.

ALEXANDER D. ROSE.
BERNHARD WILLACH.

REFERENCES CITED

The following references are of record in the file of this patent:

UNITED STATES PATENTS

| Number | Name | Date |
|---|---|---|
| 140,151 | McKeever | June 24, 1873 |
| 936,104 | Ernest | Oct. 5, 1909 |
| 1,016,166 | Marcucci | Jan. 30, 1912 |
| 1,183,059 | Balch | May 16, 1916 |
| 1,426,554 | Daving | Aug. 22, 1922 |
| 1,926,808 | Hastings | Sept. 12, 1933 |
| 2,012,741 | Brown | Aug. 27, 1935 |